May 24, 1949.  P. J. MASSARO  2,471,338
INTERCHANGEABLE EYE LENS FRAME
Filed Dec. 29, 1945
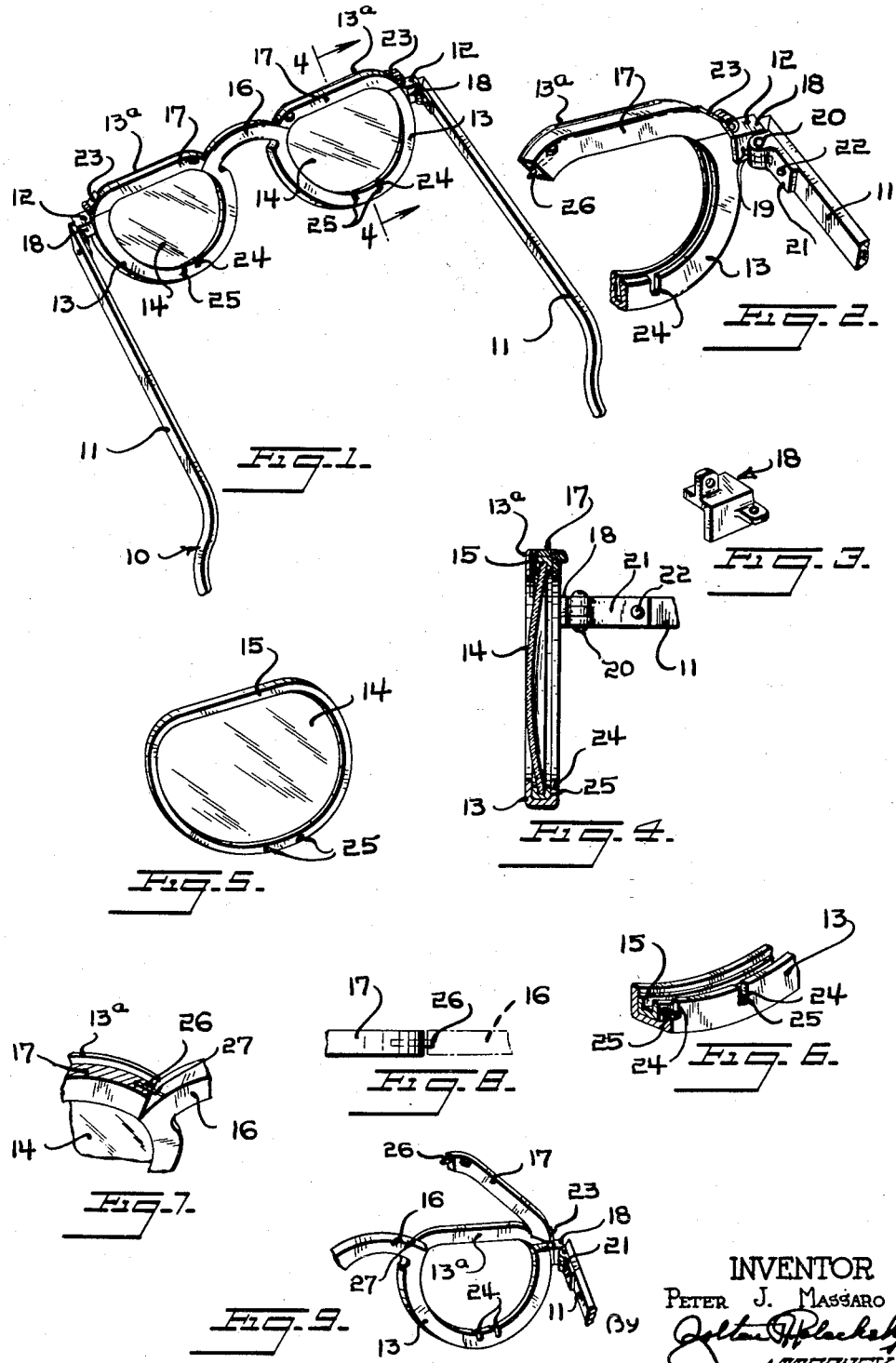
INVENTOR
PETER J. MASSARO Patented May 24, 1949

2,471,338

UNITED STATES PATENT OFFICE 2,471,338

INTERCHANGEABLE EYE LENS FRAME

Peter J. Massaro, New York, N. Y., assignor to Isidore F. Fishman, New York, N. Y.

Application December 29, 1945, Serial No. 638,047

2 Claims. (Cl. 88—47)

This invention relates to new and useful improvements in eye glass frames and similar articles. While not limited thereto, it is particularly concerned with the construction of an interchangeable eye glass frame.

Specifically, the invention is concerned with the construction of an eye glass frame permitting ready exchange of old lenses and addition of new lenses whenever desired. The frame has special features to provide for secure positioning of the lenses and to prevent positioning of the lenses in inverted or erroneously interchanged position.

While the danger of lens breakage is minimized by the several features of the invention, it should be realized that the preferred construction of the improved devices is extremely simple in nature and can readily be executed using only slight variations of equipment well-known and standardized in the art to prepare the frame from most any standard frame material. The production of the product of the invention may thus be accomplished readily at low cost and without undue outlay of material.

Besides these advantages, the new devices are extremely durable and may thus last for a great many years, even in the case of a wearer who requires frequent change of his lenses. In the case of some people heretofore requiring two or more different lens prescriptions for different usage of the glasses, it is now possible to use one and the same frame exchanging the lenses daily, yet retaining one and the same frame for extremely long periods of time.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure, where similar numerals refer to similar parts throughout the several views shown:

Fig. 1 is a perspective view of a pair of eyeglasses made in accordance with this invention.

Fig. 2 is a fragmentary enlarged perspective view showing the hinge features of the invention in more detail.

Fig. 3 is a perspective view in detail of the hinge alone and apart from the other parts of the device.

Fig. 4 is a transverse sectional view taken on line 4—4 of Fig. 1.

Fig. 5 is a perspective view of the lens in its frame.

Fig. 6 is an enlarged fragmentary perspective view showing the slotted section of the frame in more detail.

Fig. 7 is a fragmentary top sectional view showing the snap means in detail.

Fig. 8 is a top view of Fig. 7.

Fig. 9 is a fragmentary perspective view of the top frame portion shown in raised position.

In accordance with the instant invention an eye glass frame comprising ear portions 10, temple portions 11, hinge portions 12, semi-circular mountings 13 normally encircling the lower and side portions of rimmed lenses 14 which are completely framed by rims 15, and a central bridge portion 16. From each hinge portion 12 there protrudes a hinged lock member 17 which is formed so as to be guided by a narrow arcuate upper portion 13$^a$ of each semi-circular mounting 13. Each hinged lock member 17 combines with the lower and side portions of the respective semicircular mounting 13 to act as an enclosure for the respective lens 14.

Each hinge portion 12 comprises a hinge base 18 normally attached sidewise to an extension on the side portion of the respective semi-circular mounting 13 by means of miniature bolts 19. A pivot 20 on the sides of the hinge base 18 turnably connect with a hinge member 21 securely attached to the respective temple portion 11 by other miniature bolts 22. On the upper inner side of the hinge base 18, screws and nuts turnably connect with a hinge member 23 which is rigidly attached to the respective lock member 17. Hinge portions 12 thus provide hinges which permit vertical movement of the lock members 17 and horizontal turning of the temple members 11.

Each of the semi-circular mountings 13 has at its bottom a pair of irregularly spaced slots 24 distanced at variance with the corresponding spaced slots on the corresponding mounting. These slots correspond to projections 25 formed on at least one side of the lower portion of the rims 15.

It is thus possible only to insert a lens designed for the right mounting into said right mounting and a lens designed for said left mounting only into said left mounting. Of course, neutral lenses without projection may be used at will whenever the wearer wants to forego the advantage of these precautions against interchange or under emergency conditions rendering the procuring of specified rims difficult.

Each of the lock members 17 has at the side opposite to the hinge portion and normally close to the temple portion a small spring steel snap means 26 which can be entered into a small recess 27 in the bridge portion 16 so as to securely anchor the lock members to the bridge portion. With slight effort snap means 26 may be withdrawn from the recess freeing the lock member to be swung to release the respective lens 14 for removal from its respective semi-circular mounting 13.

In actual use as shown in Fig. 9, the top member 17 will normally be swung upward to permit insertion of lenses having projections fitting into said slots. The irregular spacing of the slots will then prevent having the lenses inserted inversely to the desired direction or interchanged by mistake especially by a person unfamiliar with optical principles.

For maximum comfort the rims may be made of spring steel which provides some conformity to the inner shape of the mounting and better secures the lenses to said mounting. The top member is now carefully pressed down until the snap means lock to the bridge portion providing a secure temporary mounting for the lenses which might be exchanged at any time.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an eyeglass frame having a semi-circular mount engaged about the bottom of a lens and continuing at one side into a nose-bridge, a narrow arcuate upper portion continuing from the top ends of the mount and extending across the upper periphery of the front face of the lens and spaced therefrom, a lock member pivotally attached at one end to the mount on the side remote from the nose-bridge for extension across the upper portion of the lens between the ends of the mount, and means holding said lock member releasably in its operative position across the upper portion of the lens, said lock member being of inverted U-shaped cross-section to seat over the top edge of the lens behind said arcuate upper portion with its top face flush with the upper edge of said arcuate upper portion.

2. In an eyeglass frame having a semi-circular mount engaged about the bottom of a lens and continuing at one side into a nose-bridge, a narrow arcuate upper portion continuing from the top ends of the mount and extending across the upper periphery of the front face of the lens and spaced therefrom, a lock member pivotally attached at one end to the mount on the side remote from the nose-bridge for extension across the upper portion of the lens between the ends of the mount, and means holding said lock member releasably in its operative position across the upper portion of the lens, said lock member being of inverted U-shaped cross-section to seat over the top edge of the lens behind said arcuate upper portion with its top face flush with the upper edge of said arcuate upper portion, said holding means comprises a snap means mounted on the free end of said lock member, said mount being formed with a recess at the side adjacent the nose-bridge to be releasably engaged by said snap means.

PETER J. MASSARO.

REFERENCES CITED

The following references are of record in the file of this patent:

UNITED STATES PATENTS

| Number | Name | Date |
|---|---|---|
| 194,345 | Franklin | Aug. 21, 1877 |
| 331,791 | Hull | Dec. 8, 1885 |
| 564,518 | Heilborn | July 21, 1896 |
| 1,565,890 | Baker | Dec. 15, 1925 |
| 1,659,165 | Sangren | Feb. 14, 1928 |
| 1,721,170 | Wrighton | July 16, 1929 |
| 1,735,021 | Stewart | Nov. 12, 1929 |
| 2,350,338 | Casavant | June 6, 1944 |
| 2,362,002 | Gluck | Nov. 7, 1944 |

FOREIGN PATENTS

| Number | Country | Date |
|---|---|---|
| 463,000 | Great Britain | Mar. 19, 1937 |